E. CZARNIECKI.
Nut-Locks.
No. 140,119
Patented June 24, 1873.
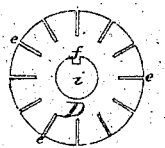
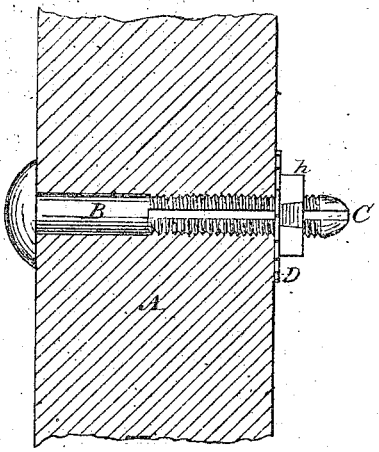
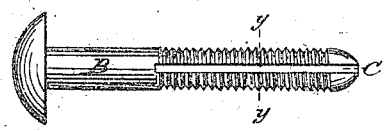
Witnesses
T. C. Brecht,
Jno. D. Patten
Inventor
Edward Czarniecki
By J. J. Johnston & Bro.
his attorneys.

UNITED STATES PATENT OFFICE.

EDWARD CZARNIECKI, OF ALLEGHENY, PENNSYLVANIA.

IMPROVEMENT IN NUT-LOCKS.

Specification forming part of Letters Patent No. 140,119, dated June 24, 1873; application filed September 11, 1872.

*To all whom it may concern:*

Be it known that I, EDWARD CZARNIECKI, of Allegheny, in the county of Allegheny and State of Pennsylvania, have invented a new and useful Improvement in Lock-Nuts; and I do hereby declare that the following is a full, clear, and exact description thereof, reference being had to the accompanying drawings and to the letters of reference marked thereon.

The nature of my invention consists in a washer provided with a series of cuts in its outer edge, extending inward on lines radiating from its center, said washer being also provided with a tongue in its opening, which is adapted to a groove in the side of a screwbolt furnished with a screw-nut, said washer, bolt, and nut being combined and operating with relation to each other as hereinafter described.

To enable others skilled in the art to make and use my invention, I will proceed to describe more fully its construction and operation.

In the accompanying drawings, which form part of my specification, Figure 1 is a top view or plan of the washer. Fig. 2 represents the bolt placed in a bar of wood, representing the bolt, provided with the washer and nut, with a section of the washer between two of the cuts turned up against the sides of the nut for the purpose of locking the nut. Fig. 3 is a side view of the bolt. Fig. 4 is a transverse section of the bolt at line $y$ of Fig. 3.

A represents a bar of wood, through which passes the bolt B, which is of ordinary construction, except the groove C made in its side, as shown in Figs. 3 and 4. D represents the washer, which is constructed of sheet metal. The outer edge of the washer D is provided with a series of cuts, $e$, which extend inward on lines radiating from the center of it. Projecting inward from the side of the opening $i$, in the washer, is a tongue, $f$, which is adapted to the groove C in the side of the bolt B. The washer D is placed over the bolt, with its tongue, $f$, in the groove C, the nut $h$ is then screwed on the bolt B, and when brought "home" against the washer one of the sections between two of the cuts $e$ is bent up against the side of the nut, as shown in Fig. 2, thereby holding the nut in a fixed position upon the bolt, the tongue $f$ in the groove C preventing the washer from turning.

By constructing the washer D in the manner hereinbefore described the nut can be securely locked at any point on the bolt when brought home against the washer by simply turning up one of the sections between two of the cuts $e$.

The advantage of a washer and bolt constructed as hereinbefore described, and combining them with an ordinary screw-nut for the purpose of locking it upon the bolt will be apparent to the skillful mechanic.

Having thus described my improvement, what I claim as of my invention is—

The circular washer D, with a series of cuts, $e$, extending inward from its periphery on lines radiating from its center, and the opening $i$ of the said washer provided with a tongue, as herein described, and for the purpose set forth.

EDW. CZARNIECKI.

Witnesses:
A. C. JOHNSTON,
JAMES J. JOHNSTON.